(12) United States Patent
Miyashita et al.

(10) Patent No.: US 8,031,269 B2
(45) Date of Patent: Oct. 4, 2011

(54) CHROMA KILLER DETECTION CIRCUIT

(75) Inventors: Kazuya Miyashita, Osaka (JP); Toshihiro Matsumura, Shiga (JP)

(73) Assignee: Panasonic Corporation, Osaka (JP)

( * ) Notice: Subject to any disclaimer, the term of this patent is extended or adjusted under 35 U.S.C. 154(b) by 846 days.

(21) Appl. No.: 12/089,863

(22) PCT Filed: Sep. 19, 2006

(86) PCT No.: PCT/JP2006/318494
§ 371 (c)(1),
(2), (4) Date: Apr. 10, 2008

(87) PCT Pub. No.: WO2007/043286
PCT Pub. Date: Apr. 19, 2007

(65) Prior Publication Data
US 2009/0135302 A1  May 28, 2009

(30) Foreign Application Priority Data
Oct. 11, 2005  (JP) ................. 2005-296924

(51) Int. Cl.
*H04N 9/70* (2006.01)
*H04N 9/77* (2006.01)

(52) U.S. Cl. ........ 348/643; 348/638; 348/644; 348/646; 348/663

(58) Field of Classification Search .......... 348/638, 348/643, 644, 646, 663
See application file for complete search history.

(56) References Cited

U.S. PATENT DOCUMENTS

| | | |
|---|---|---|
| 4,514,754 A | 4/1985 | Nillesen et al. |
| 4,546,377 A | 10/1985 | Kasagi et al. |
| 4,609,938 A | 9/1986 | Suzuki et al. |
| 5,831,680 A | 11/1998 | Azuma et al. |
| 2003/0035068 A1 | 2/2003 | Yoshii et al. |
| 2005/0117063 A1* | 6/2005 | Matsumura et al. ......... 348/638 |
| 2008/0252790 A1* | 10/2008 | Serizawa ...................... 348/663 |

FOREIGN PATENT DOCUMENTS

| | | |
|---|---|---|
| EP | 0 309 672 | 4/1989 |
| JP | 58-215888 | 12/1983 |
| JP | 6-14337 | 1/1994 |
| JP | 7-75123 | 3/1995 |
| JP | 2000-270341 | 9/2000 |
| JP | 2001-265591 | 9/2001 |
| JP | 2005-167997 | 6/2005 |

OTHER PUBLICATIONS

International Search Report issued Nov. 7, 2006 in the International (PCT) Application No. PCT/JP2006/318494.
Written Opinion of the ISA issued Nov. 7, 2006 in the International (PCT) Application No. PCT/JP2006/318494.
Supplementary European Search Report issued Aug. 30, 2010 in Application No. EP 06 79 8105.

* cited by examiner

*Primary Examiner* — Kieu Oanh Bui
(74) *Attorney, Agent, or Firm* — Wenderoth, Lind & Ponack, L.L.P.

(57) ABSTRACT

In the chroma killer detection for detecting the abnormality of the burst signal, in addition to the circuits (1004, 1005, 1006) for detecting the states of the components of the burst signal, which circuits are for selecting the cos θ data of the burst signal, circuits (1050, 1051, 1052) for detecting the states of the R-Y components, which circuits are for selecting sin θ data are employed for chroma killer detection. Thereby, it is possible to enhance the detection precision of the abnormality states of the burst signal and the precision for discrimination of the broadcasting system.

4 Claims, 8 Drawing Sheets

CHROMA KILLER DETECTION CIRCUIT

TECHNICAL FIELD

The present invention relates to a chroma killer circuit which carries out a chroma killer control that is related to a color signal modulation circuit for performing a color signal processing.

BACKGROUND ART

In recent years, digitization of the receiving device of analog television broadcasting is progressing from progress of semiconductor technology, and it is important in particular to realize a receiving device that is common through broadcasting systems (NTSC, PAL, SECAM). In this situation, a chroma killer circuit is an important circuit in order to detect the phase state of the burst signal in the television video image signal and specify the signal state which is now under reception as well as the broadcasting system.

Hereinafter, the construction and the operation of the entire video image reproduction device and the prior art chroma killer detection circuit will be described with reference to the drawings.

FIG. 9 is a construction diagram illustrating the entirety of the video image reproduction device. A video image reproduction device 4001 includes a video image signal input terminal 4002, an AD converter 4003, a YC separation circuit 4004, a reference clock generator circuit 4005, a chroma killer detection circuit 4006, a color signal demodulation circuit 4007, a chroma killer control circuit 4008, a luminous signal output terminal 4009, a R-Y signal output terminal 4010, and a B-Y signal output terminal 4011.

The video image signal 4102 which is inputted to the video image signal input terminal 4002 is inputted to the AD converter 4003. The AD converter 4003 is operated with a reference clock 4101 which is outputted from the reference clock generator circuit 4005 to convert the video image input signal 4102 to a digital signal. The digitally converted signal is inputted to the YC separation circuit 4004. The YC separation circuit 4004 is operated with the reference clock 4101 to output a luminous signal component 4103 and a color signal component 4104 which are included in the video image signal 4102. The luminous signal 4103 is outputted to outside the block via the luminous signal output terminal 4009.

The reference clock generator circuit 4005 generates a reference clock, i.e., a burst clock which is synchronized with the burst signal portion of the video image signal 4102. Herein, it is supposed that the clock frequency of the reference clock 4101 is supposed as four times of the burst signal.

Hereinafter, the construction and operation of the reference clock generator circuit 4005 will be described in detail.

The reference clock generator circuit 4005 includes a burst detection circuit 4021, the phase comparator 4022, an accumulation adder 4023, a lamp wave generator circuit 4024, a sinusoidal wave generator circuit 4025, a DA converter 4026, an LPF 4027, a four times frequency multiplier circuit 4028, and a four times frequency divider circuit 4029.

The color signal component 4104 is inputted to the phase comparator 4022 and the burst detection circuit 4021. The burst detection circuit 4021 detects the burst signal included in the color signal component 4104, and outputs a burst gate pulse 4120 which is being ON during the burst signal period, thereby indicating the presence of the burst signal. The burst gate signal 4120 is inputted to the phase comparison circuit 4022, the chroma killer detection circuit 4006, and the color signal demodulation circuit 4007. The four times frequency division circuit 4029 carries out a four times frequency division of the reference clock 4101 which is synchronized with the frequency of four times as the frequency of the burst signal, and inputs the signal having the frequency that is equal to that of the burst signal into the phase comparator 4022. The phase comparator 4022 carries out a phase comparison on the color signal component 4104 and the signal which is generated by the four times frequency division circuit 4029. The phase comparison is carried out during the period during which the burst gate pulse 4120 is ON, i.e., during the period during when the burst signal is present, and the result is inputted to the accumulation adder 4023 as a phase error information for a burst lock. The accumulation adder 4023 carries out accumulation addition for the phase error information, and the result is inputted to the lamp wave generator circuit 4024. The lamp wave generator circuit 4024 generates a lamp wave having an inclination of the lamp wave that is equal to the output of the accumulation adder 4023. The SIN wave generator circuit 4025 builds in therein a SIN wave ROM having N pieces of addresses, and when it is assumed that the output of the lamp wave generator circuit 4024 is "X" and the SIN wave output is "Y", Y=sin(X/N) is satisfied.

Herein, the accumulation adder 4023 has an offset for its center value, and when it is in a burst lock, the phase error information is zero, and therefore, the accumulation addition result does not reflect it and the center value is outputted. In other words, the center value is selected so that the SIN wave which is synchronized with the burst value is generated from the SIN wave generator circuit 4025. While the burst signal frequency is assigned to any of the 4.43 MHz, or 3.58 MHz dependent on the broadcasting system, it takes any of appropriate center values dependent on the received broadcasting. On the other hand, when the phase error is not zero, in order to acquire burst lock, the accumulation adder 4023 varies its center value, and controls the inclination of the lamp wave. Thereby, it is possible to always acquire the burst lock.

Then, the output of the SIN wave generator circuit 4025 is converter into an analog signal by the DA converter 4026, discrete noise components therein are removed by the LPF 4027, and the result signal is outputted with taking clocks which are obtained by the four times multiplier circuit 4028 being synchronized with the four times frequency of the burst signal as reference clock signals 4101 to external circuits.

The color signal components 4104, the reference clock 4101, and the bust gate pulse 4120 are inputted to the color signal reproduction circuit 4007. The color signal demodulation circuit 4007 is operated with the period of the reference clock 14101, and carries out phase demodulation with employing the phases of the burst signal portions which are detected with the burst gate pulse 4120 as references and the results are inputted to the chroma killer control circuit as R-Y signal and B-Y signal, respectively.

The chroma killer detection circuit 4006 detects the abnormality state of the burst signal (i.e., carries out chroma killer detection) on the basis of the color signal components 4104, the reference clocks 4101, and the burst gate pulse 4120, and outputs the result as the chroma killer signal 4140.

The chroma killer control circuit 4008 has a construction so as to halt the output of the demodulation output from the color signal demodulation circuit 4007 when it detects the chroma killer from the chroma killer detection circuit 4006, and the results are outputted from the R-Y signal output terminal 4010 as the R-Y signal 4150 and from the B-Y signal output terminal 4011 as the B-Y signal 4051, respectively.

Next, the construction and operation of the chroma killer detection circuit 4006 will be described with reference to FIG. 5.

The chroma detection circuit 4006 includes a first flip flop 5001, a second flip flop 5002, a third flip flop 5003, a burst cos θ data selection circuit 5004, a threshold setting circuit 5005, a comparator 5006, an up down counter 5007, an OR circuit 5008, a counter upper limit detection circuit 5009, and a counter lower limit detection circuit 5010.

The color signal components 4104 are inputted to the first flip flop 5001 ad the burst cos θdata selection circuit 5004. The output of the first flip flop 5001 is inputted to the second flip flop 5003 and the burst cos θdata selection circuit 5004. The output of the second flip flop 5002 is inputted to the third flip flop 5003 and the burst cos θ data selection circuit 5004. The first flip flop 5001, the second flip flop 5002, and the third flip flop 5003 are operated with reference clocks 4101, respectively.

Here, the color signal components 4104 will be described in detail. In the NTSC, PAL systems, the color signal components 4104 include color signals which are phase modulated, and they are represented by formulae with supposing the carries are sinusoidal waves, as follows:

$$R \sin(\omega T + \theta)$$

Here, R denotes amplitude, ω denotes an angular velocity, and $f_{sc}$ denotes a carrier frequency which is about 3.58 MHz in the case of NTSC system. θ denotes a color component information that is phase modulated, and in the burst signal portion thereof serving as a reference for the color component information, it is phase modulated such that θ is 180° in the case of NTSC system. T denotes a sampling period and the chroma killer detection circuit 4006 is operated with the reference clock 4101, i.e., clocks which are synchronized with the four times frequency of the burst signal. Accordingly, when it is supposed as $t=(¼f_{sc})$, the T takes values such as {0, 1t, 2t, 3t, ... }. With it is supposed that the above-described signal components are inputted, the input of the first flip flop 5001 becomes as follows, when T=0 is assumed, $$\text{input of first flip flop 5001 is } R \sin(\theta) \text{ (when } T=0) \quad (1),$$

and similarly, $$\text{input of second flip flop 5002 is } R \cos(\theta) \text{ (when } T=t) \quad (2),$$

$$\text{input of third flip flop 5003 is } -R \sin(\theta) \text{ (when } T=2t) \quad (3),$$

$$\text{output of third flip flop 5003 is } -R \cos(\theta) \text{ (when } T=3t) \quad (4),$$

and
the respective carrier frequency components of the respective formulae (1) to (4) are removed, thereby remaining only θ components. Herein, the examples of the above-described formulae (1) to (4) are not limited thereto, but the result of the order of R sin(θ), R cos (θ), −R sin(θ), −R cos(θ) is surely obtained.

For example, since θ in the burst signal portion is 180°, the followings are obtained in the example of the above (1) to (4):

$$R \sin(180)=0 \quad (1)'$$

$$R \cos(180)=-R \quad (2)'$$

$$-R \sin(180)=0 \quad (3)'$$

$$-R \cos(180)=R \quad (4)'$$

When the information θ is replaced into vector diagrams which are based on the R-Y components and the B-Y components as shown in FIG. 6, the burst signals in the NTSC system become as 601. Herein, the color signal components 4104 are rotated with the period of the burst signal on the circle of radius R, and if they are burst locked, it is meant that the data sampling is carried out at the timings of 602, 603, 604, and 605 as shown in FIG. 6. Further, in the examples of above (1) to (4), the sampled data at the timing of 602 is R sin(θ) which is an input to the first flip flop 5001, the sampled data at the timing of 603 is R cos(θ) which is an input to the second flip flop 5002, the sampled data at the timing of 604 is −R sin(θ) which is an input to the third flip flop 5003, and the sampled data at the timing of 605 is −R cos(θ) which is an output from the third flip flop 5003.

The burst cos θ data selection circuit 5004 outputs the burst signal information which is required for the detection of the chroma killer signal. The burst signal has only the value of B-Y signal components as represented by the vector 601, and becomes as (2)'. Therefore, the data of (2)' which is sampled at the timing of 603 among the above (1)' to (4)' is selected, and it is used for the chroma killer detection which is performed then.

Now, since in the usual signal state both of amplitude and phase are stable, the data "−R" is continued to be sampled at the timing of 603. On the other hand, when the input is carried put in abnormality states such as weak electric field environment, VTR input, or a different broadcasting system input, it is not possible to sample the input data "−R". The comparator 5006 selects whether the sampled data is in the normal state or in the abnormal state, and its result is inputted to the up down counter 5007.

FIG. 7 illustrates a method of selecting sampled data. Numeral 701 denotes the output of the threshold setting circuit which takes an arbitrary value on the B-Y components. The comparator 5006, which takes the value 701 as the threshold value of the B-Y components, judges it is in the normal state when there is a vector in the region 702 in the vector diagram and makes an UP signal inputted to the up down counter 5007, while judges it is in the abnormal state when there is a vector in the region of 703 and makes a DOWN signal inputted to the up down counter 5007. The up down counter 5007 counts the comparison result of the comparator 5006 and makes the counted result to the counter upper limit detection circuit 5009 and the counter lower limit detection circuit 5010. The counter upper limit detection circuit 5009 makes, when the counted result of the up down counter 5007 has reached the upper limit value, a signal indicating that fact inputted to the OR circuit 5008. The counter lower limit detection circuit 5010 makes, when the counted result of the up down counter 5007 has reached the lower limit value, a signal indicating that fact inputted to the OR circuit 5008, and further, outputs this signal as a chroma killer signal 4140 to the outside. The OR circuit 5008 carries out such a control that the up down counter 5007 is held.

The conditions on which the up down counter 5007 is held are satisfied during when the counter upper limit detection circuit 5009 has detected the upper limit value, when the counter lower limit detection circuit 5010 has detected the lower limit value, or when the input signal is not in the burst portion. Until when the counter lower limit detection circuit 5010 detects the lower limit value while the comparison result of the comparator 5006 being counted by the up down counter 5007, the DOWN signal is inputted as abnormal state to the up down counter 5007, and when the abnormality state of the burst signal is continued to be detected, the chroma killer detection is turned ON.

Patent document 1: Japanese Published Patent Application No. 2001-265591

DISCLOSURE OF THE INVENTION

Problems to be Solved by the Invention

As the method of detecting the phase information of the burst signal, the conventional chroma killer detection circuit has the following problems since it carries out the detection only dependent on the B-Y components information.

As a first problem, it was a problem that the conventional chroma killer detection circuit cannot detect the change in the broadcasting system of the input signal such as from NTSC to PAL-M or from PAL-M to NTSC.

The reason thereof is described with reference to FIG. 8.

FIG. 8 is a vector diagram of PAL for illustrating the operation of the conventional chroma killer detection circuit. Contrary to that the burst signal phase of NTSC system is at a constant of 180°, the burst signal phase of PAL system has a nature of alternating between −135° of 801 and +135° of 802 for every line. On the other hand, the burst signal phase of NTSC system is constant as 180° of 803 as described above. However, the PAL-M system is the M system (the scanning line number is 525, the field frequency is 60 Hz, and the carrier wave frequency is 3.58 MHz) that is the same as the NTSC system, and the sampling points are also the same. Accordingly, if the threshold of 804 is set between 0 and −R√2, the relations between the B-Y signal components at 805 as the sampling points in the NTSC and the threshold 804 is not different between the both systems of NTSC and PAL-M. Therefore, in order to discriminate the inputs of mutual systems, the information of R-Y components of the burst signal phase are required and it is necessary to detect the 180° of NTSC system and ±135° PAL-M system.

As a second problem, there is a problem that "the pheudo burst lock" cannot be detected.

When signals which are in non-stationary states in view of time such as VTR, weak electric field, non-standard name signals, and presence/non-presence of input signals or burst signals are inputted, there may be cases where the reference clock generator circuit 4005 do not follow these, and there arise deviations in the data sampling points of the chroma killer detection circuit 4006. By this phenomenon, there may occur so-called "pseudo burst lock" in which though the burst signal phase should be at 180° in NTSC signals, the burst locking occurs at a phase which is not equal to 180°. In this case, there may occur situations where it cannot be correctly judged whether the burst lock has occurred or not, since the phase information of the burst signal depends on the B-Y signal components.

The present invention is directed to solving the above-described problems and has for its object to provide a chroma killer detection circuit which has enhanced the preciseness in detecting the phase information of the burst signal by an addition of relatively simple circuits to the conventional circuits, i.e., by providing, in addition to a circuit for selecting cos θ data of the burst signal, a circuit for selecting sin θ data of the burst signal.

Measures to Solve the Problems

In order to solve the above-described problems, a chroma killer detection circuit according to claim 1 of the present invention, comprises: a sampling circuit which receives a reference clock signal which has a frequency of four times of the burst signal which is generated from the color signal components which are digitized and which are synchronized with the burst signals and samples the cos θ components of the digitized color signal components on the (B-Y) axis, −cos θ components thereof on the −(B-Y) axis, sin θ components thereof on (R-Y) axis, and −sin θ components thereof on −(R-Y) axis; a cos θ components selection circuit for selecting cos θ components data among the data which are outputted from the sampling circuit; a first threshold value setting circuit for setting an arbitrary value on the (B-Y) axis which corresponds to the cos θ components data; a first comparator which compares the set value of the first threshold value setting circuit and the output data of the cos θ components data selection circuit and judges whether the cos θ components data on the (B-Y) axis are in abnormality state or in normal state from the comparison result; a |sin θ| components data selection circuit which selects the |sin θ| components data from the data which are outputted from the sampling circuit; a second threshold value setting circuit for setting an arbitrary value on the (R-Y) axis corresponding to the |sin θ| components data; a second comparator which compares the set value of the second threshold value setting circuit and the output data of the |sin θ| components data selection circuit and judges whether the |sin θ| components data on the (R-Y) axis are in abnormality state or in normal state from the comparison result; a judging circuit for judging normality or abnormality on the basis of the judgment result of the first comparator and the judgment result of the second comparator; a counter circuit for carrying out counting up when the judging circuit judges as normal, while carrying out counting down when the judging circuit judges as abnormal; a counter upper limit detection circuit which observes the counting result of the counter circuit and outputs, when the counted value reaches a predetermined upper limit value, a signal indicating that; a counter lower limit detection circuit which observes the counting result of the counter circuit and outputs, when the counted value reaches a predetermined lower limit value, a signal indicating that; a means for halting the counting by the counter circuit when the counter upper limit detection circuit has detected the counter upper limit value, or when the counter lower limit detection circuit has detected the counter lower limit value, or when among the digitized color components signals, those other than the burst signal components are inputted; and a chroma killer signal indicating abnormality of the burst signal being outputted when a signal indicating that the lower limit value has been reached is outputted from the counter lower limit detection circuit.

Thereby, when generating a chroma killer signal, in addition to the cos θ components data on the (B-Y) axis, the |sin θ| components data on the (R-Y) axis can also be reflected as a phase information of the burst signal, and thereby, the precision in detecting the chroma killer can be enhanced.

According to Claim 2 of the present invention, there is provided a chroma killer detection circuit as defined in claim 1, wherein the first comparator outputs a signal indicating the normal state when the cos θ components data are smaller than the set value of the first threshold value setting circuit, the second comparator outputs a signal indicating the normal state when the |sin θ| components data are smaller than the set value of the second threshold value setting circuit, the judging circuit takes a logic product of the output of the first comparator and the output of the second comparator thereby to judge whether the burst signal is in normal or in abnormal.

Thereby, it is possible to carry out detect of the signal input other than the NTSC system in the chroma killer detection with high precision.

According to Claim 3 of the present invention, there is provided a chroma killer detection circuit which comprises: a sampling circuit which receives a reference clock signal which has a frequency of four times of the burst signal which is generated from the color signal components which are digitized and which are synchronized with the burst signals and samples the cos θ components of the digitized color signal components on the (B-Y) axis, −cos θ components thereof on the −(B-Y) axis, sin θ components thereof on (R-Y) axis, and −sin θ components thereof on −(R-Y) axis; a cos θ components selection circuit for selecting cos θ components data among the data which are outputted from the sampling circuit; a first threshold value setting circuit for setting an arbitrary value on the (B-Y) axis which corresponds to the cos θcomponents data; a first comparator which compares the set value of the first threshold value setting circuit and the output data of the cos θ components data selection circuit and judges whether the cos θcomponents data on the (B-Y) axis are in abnormality state or in normal state from the comparison result; a −sin θcomponents data selection circuit which selects the −sin θ components data among the data which are outputted from the sampling circuit; a third threshold value setting circuit for setting an arbitrary value on the −(R-Y) axis corresponding to the −sin θ components data: a third comparator which compares the set value of the third threshold value setting circuit and the output data of the −sin θ components data selection circuit and judges whether the −sin θ components data on the −(R-Y) axis are in abnormality state or in normal state from the comparison result; a +sin θ components data selection circuit which selects the +sin θ components data among the data which are outputted from the sampling circuit; a fourth threshold value setting circuit for setting an arbitrary value on the +(R-Y) axis corresponding to the +sin θ components data; a fourth comparator which compares the set value of the fourth threshold value setting circuit and the output data of the +sin θ components data selection circuit and judges whether the +sin θ components data on the +(R-Y) axis are in abnormality state or in normal state from the comparison result; a judging circuit for judging normality or abnormality on the basis of the judgment result of the first comparator, the judgment result of the third comparator, and the judgment result of the fourth comparator; a counter circuit for counting the judgment result of the judgment circuit; a counter upper and lower limit detection circuit which observes the counted result of the counting circuit and outputs, when the counted value reaches a predetermined upper limit value or when the counted value reaches a predetermined lower limit value, a signal indicating that, respectively; a first killer judgment circuit which caries out killer judgment on the basis of the judgment result of the first comparator, the judgment result of the third comparator, the judgment result of the fourth comparator, and the output of the counter upper and lower limit value detection circuit; a second killer judgment circuit which caries out killer judgment on the basis of the judgment result of the first comparator, the judgment result of the third comparator, the judgment result of the fourth comparator, and the output of the counter upper and lower limit value detection circuit; and a killer judgment decoder circuit which decodes the results of the first killer judgment circuit and the second killer judgment circuit and generates a chroma killer signal indicating the broadcasting system of the received signal.

Thereby, when generating a chroma killer signal, in addition to the cos θ components data on the (B-Y) axis, the −sin θ components data on the −(R-Y) axis and the +sin θ components data on the (R-Y) axis can also be reflected as phase information of the burst signal.

According to Claim 4 of the present invention, there is provided a chroma killer detection circuit as defined in claim 3, wherein the first comparator outputs a signal indicating the normal state when the cos θ components data is lower than the set value of the first threshold value setting circuit, the third comparator outputs a signal indicating the normal state when −sin θ components data is lower than the set value of the third threshold value setting circuit, the fourth comparator outputs a signal indicating the normal state when +sin θ components data is lower than the set value of the fourth threshold value setting circuit, the judging circuit outputs the result of taking a logical product of the output of the first comparator and the output of the third comparator as the first judgment result, and outputs the result of taking a logical product of the output of the first comparator and the output of the fourth comparator as a second judgment result, the counter circuit carries out counting up when it receives the output of the first judgment result, carries out counting down when it receives the output of the second judgment result, and stops the counting when the counter upper and lower limit detection circuit has detected the upper limit or the lower limit or when other than the burst signal portion among the digitized color signal components signal are being inputted.

Thereby, it is possible to detect the signal input other than the NTSC by the chroma killer detection with high precision.

According to Claim 3 of the present invention, there is provided a chroma killer detection circuit as defined in claim 3, wherein the first killer judgment circuit outputs a first killer judgment detection signal to the killer judgment decoder circuit when it receives any of a signal indicating abnormality state from the first comparator, a signal indicating abnormality state from the third comparator, a signal indicating abnormality state from the fourth comparator, and a signal indicating the detection of the upper or lower limit by the counter upper and lower limit detection circuit, the second killer judgment circuit outputs a second killer judgment detection signal to the killer judgment decoder circuit when it receives any of a signal indicating abnormality state from the first comparator, a signal indicating abnormality state from the third comparator, a signal indicating abnormality state from the fourth comparator, and a signal indicating the detection of the upper or lower limit by the counter upper and lower limit detection circuit, and the killer judgment decoder circuit outputs a chroma killer signal indicating that a signal of a system other that the PAL system is being inputted when it has received the first killer judgment detection signal, outputs a chroma killer signal indicating that a signal of a system other that the NTSC system is being inputted when it has received the second killer judgment detection signal, and outputs a chroma killer signal indicating that a signal of a system other than the PAL system and the NTSC system is being inputted when it has received both of said first and second killer judgment detection signals.

Thereby, it is possible to carry out judgment of input signals between the PAL-M which has the M system that is the same in the NTSC system among the PAL systems, and the NTSC system.

Effects of the Invention

According to the chroma killer detection circuit of the present invention, it is possible to enhance the precision in detecting the pheudo lock state and to carry out discrimination of the broadcasting system of the signals being inputted by detecting the natures of the burst signals for each of the broadcasting systems.

DESCRIPTION OF REFERENCE NUMERALS

1000 . . . chroma killer detection circuit
1001 . . . first flip-flop
1002 . . . second flip-flop
1003 . . . third flip-flop
1004 . . . burst cos θ data selection circuit
1005 . . . first threshold value setting circuit
1006 . . . first comparator
1007 . . . up down counter
1008 . . . or circuit
1009 . . . counter upper limit detection circuit
1010 . . . counter lower limit detection circuit
1050 . . . burst |sin θ| data selection circuit
1051 . . . second threshold value setting circuit
1052 . . . second comparison machine
1053 . . . AND circuit
3050 . . . burst sin θ data selection circuit
3051 . . . third threshold value setting circuit
3054 . . . third comparator
3052 . . . burst +sin θ data selection circuit
3053 . . . fourth threshold value setting circuit
3055 . . . fourth comparator
3041 . . . first AND circuit
3042 . . . second AND circuit
3043 . . . up down counter
3044 . . . counter upper limit and lower limit detection circuit
3045 . . . first OR circuit
3046 . . . second OR circuit
3047 . . . third OR circuit
3048 . . . killer decoder circuit
4101 . . . reference clock signal
4104 . . . color signal components
4120 . . . burst gate pulse
4140 . . . chroma killer signal

BEST MODE TO EXECUTE THE INVENTION

Hereinafter, embodiment of the present invention will be described with reference to the drawings.

First Embodiment

Figure 1:
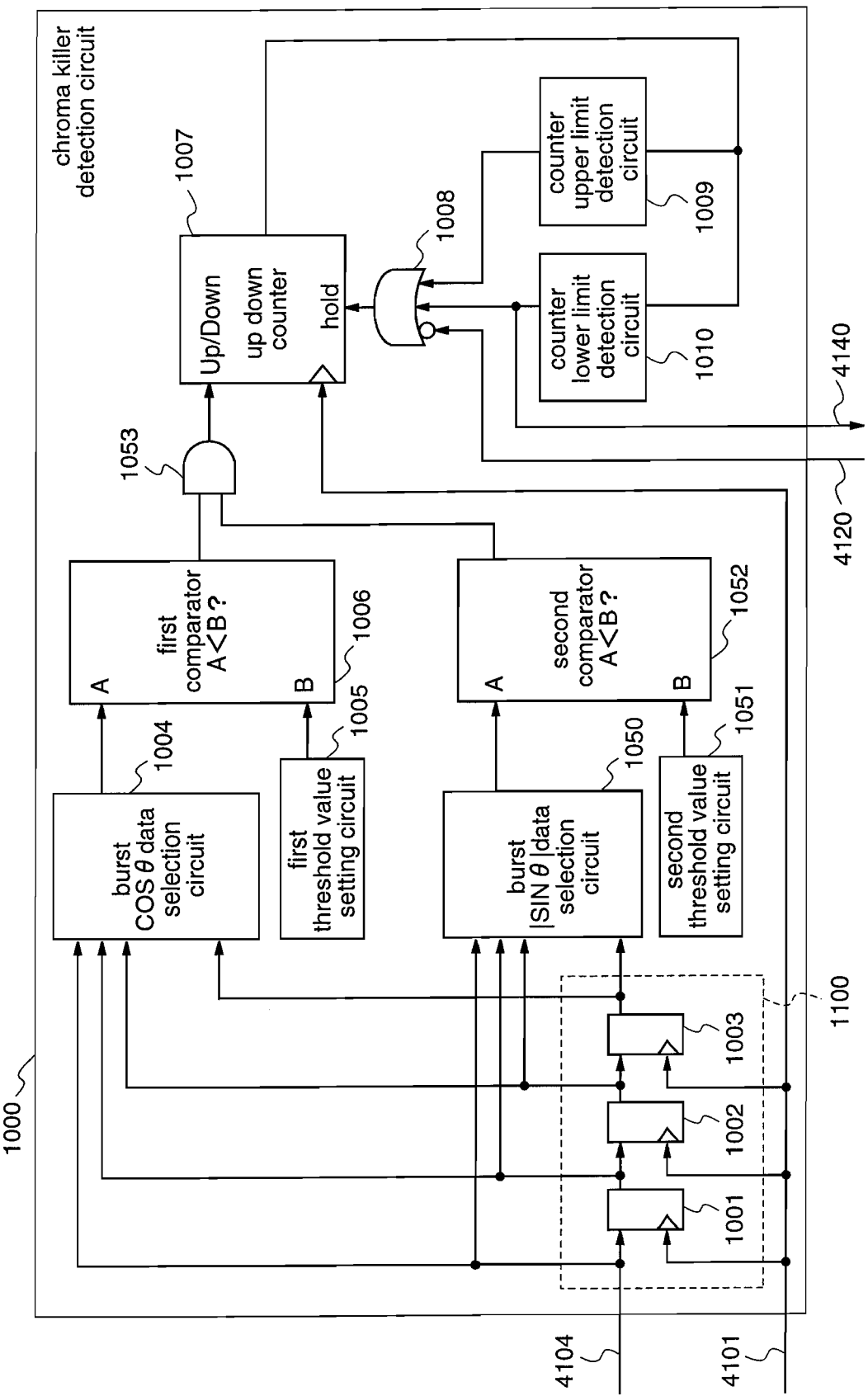
FIG. 1 is a circuit diagram illustrating a chroma killer detection circuit according to a first embodiment of the present invention.
Figure 9:
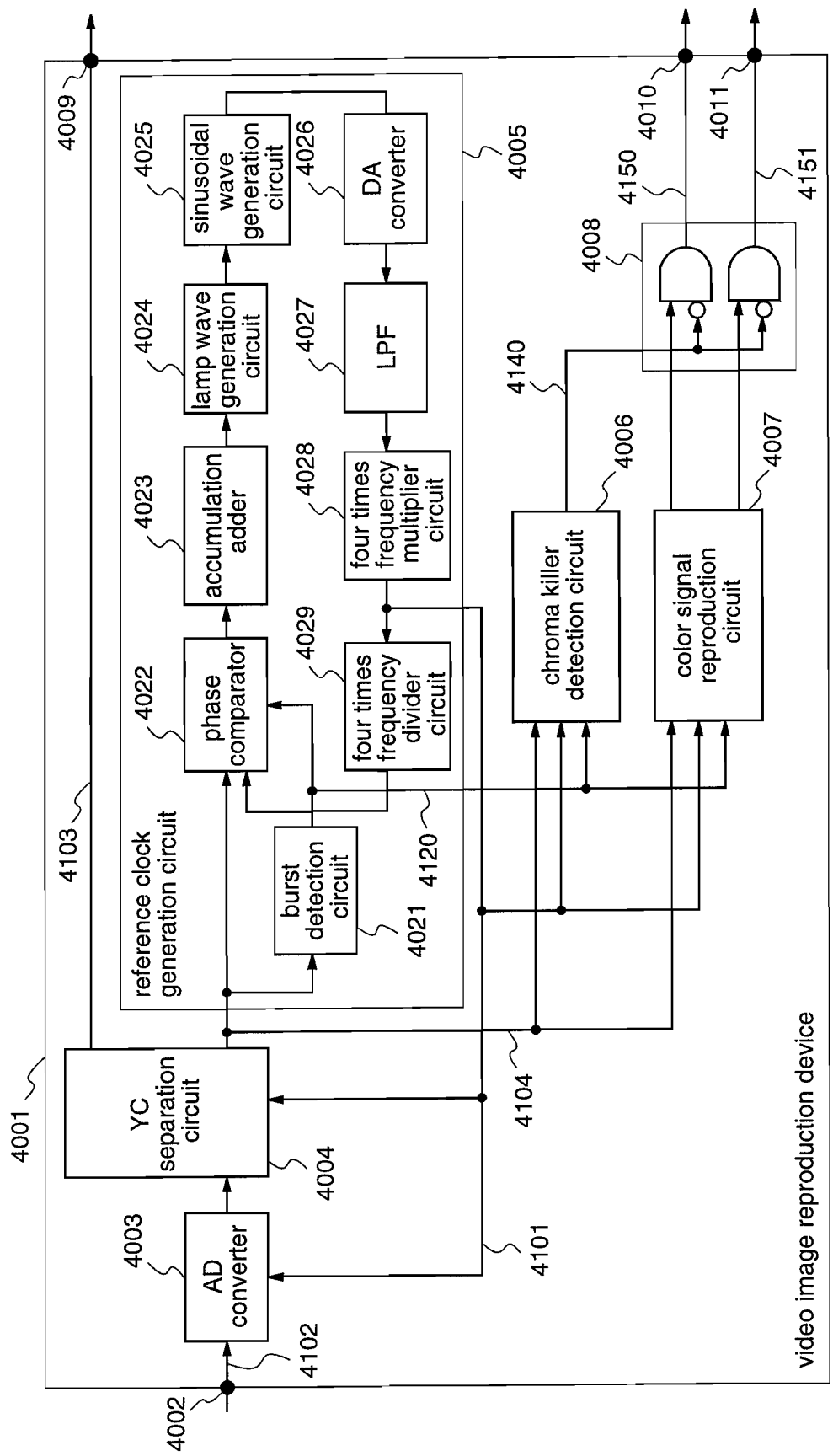
FIG. 9 is a block diagram showing the whole image recovery processing unit.

FIG. 1 is a construction diagram illustrating a chroma killer detection circuit according to a first embodiment of the present invention. The chroma killer detection circuit of this first embodiment is employed as a chroma killer detection circuit 4006 in the video image reproduction device as shown in FIG. 9, similarly as the conventional chroma killer detection circuit shown in FIG. 5.

In FIG. 1, the chroma killer detection circuit 1000 in the first embodiment is constructed as provided with a sampling circuit comprising a first flip flop 1001, a second flip flop 1002, and a third flip flop 1003, a burst cos θ data selection circuit 1004, a first threshold value setting circuit 1005, a first comparator 1006, an up down counter 1007, an OR circuit 1008, a counter upper limit detection circuit 1009, a counter lower limit detection circuit 1010, a burst |sin θ| data selection circuit 1050, a second threshold value setting circuit 1051, a second comparator 1052, and an AND circuit 1053.

Next, the operation of the chroma killer detection circuit 1000 of this first embodiment will be described.

The color signal components 4104 is inputted to the first flip-flop 1001, the burst cos θ data selection circuit 1004, and the burst |sin θ| data selection circuit 1050. The output of the first flip flop 1001 is inputted to the second flip flop 1002, the burst cos θ data selection circuit 1004, and the burst |sin θ| data selection circuit 1050. The output of the second flip flop 1002 is inputted to the third flip flop 1003, the burst cos θ data selection circuit 1004, and the burst |sin θ| data selection circuit 1050. The first flip flop 1001, the second flip flop 1002, and the third flip flop 1003 are operated with the reference clock 4101, respectively.

Figure 6:
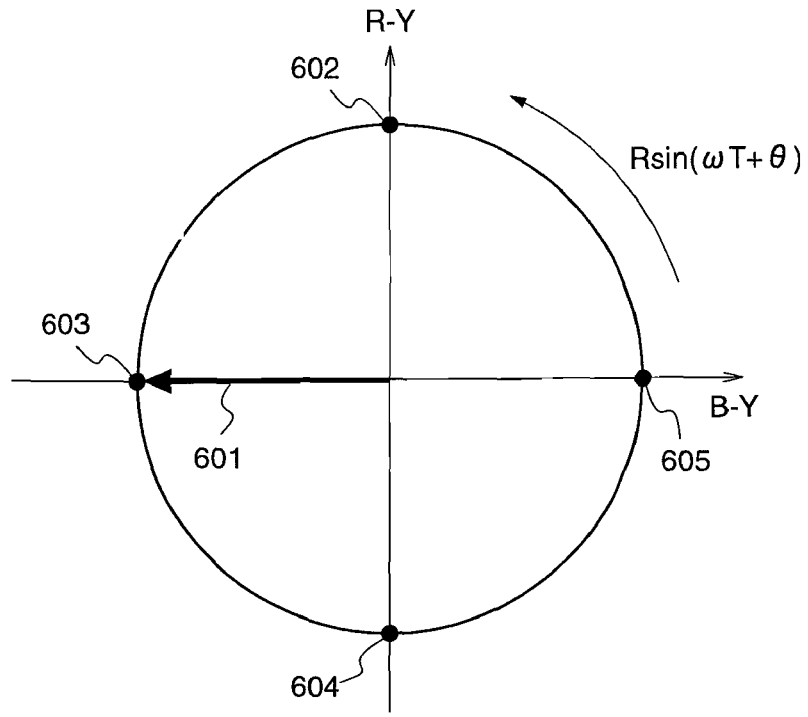
FIG. 6 is a vector diagram of NTSC system for explaining the operation of the conventional chroma killer detection circuit.

The burst |sin θ| data selection circuit 1050 selects and outputs the burst signal information that is required for the chroma killer detection. The above-described (1)' to (4)' are again recited as follows:

$$R \sin(180) = 0 \qquad (1)'$$

$$R \cos(180) = -R \qquad (2)'$$

$$-R \sin(180) = 0 \qquad (3)$$

$$-R \cos(180) = R \qquad (4)'$$

and, the data (1)', and (3)' which are sampled at the timings of 602 and 604 in FIG. 6 among them can be recognized as sinusoidal signal components of the burst signal, i.e., R=Y components. The burst |sin θ| data selection circuit 1050 selects the data of (1)' and (3)', makes these subjected to the absolute value conversion, and makes the result inputted to the second comparator 1052. Here, though the data of (1)' and (3) become the same data when the absolute value conversion is carried out, it is possible to employ either of (1)' or (3)' or the mean of those in view of the system stability.

Figure 5:
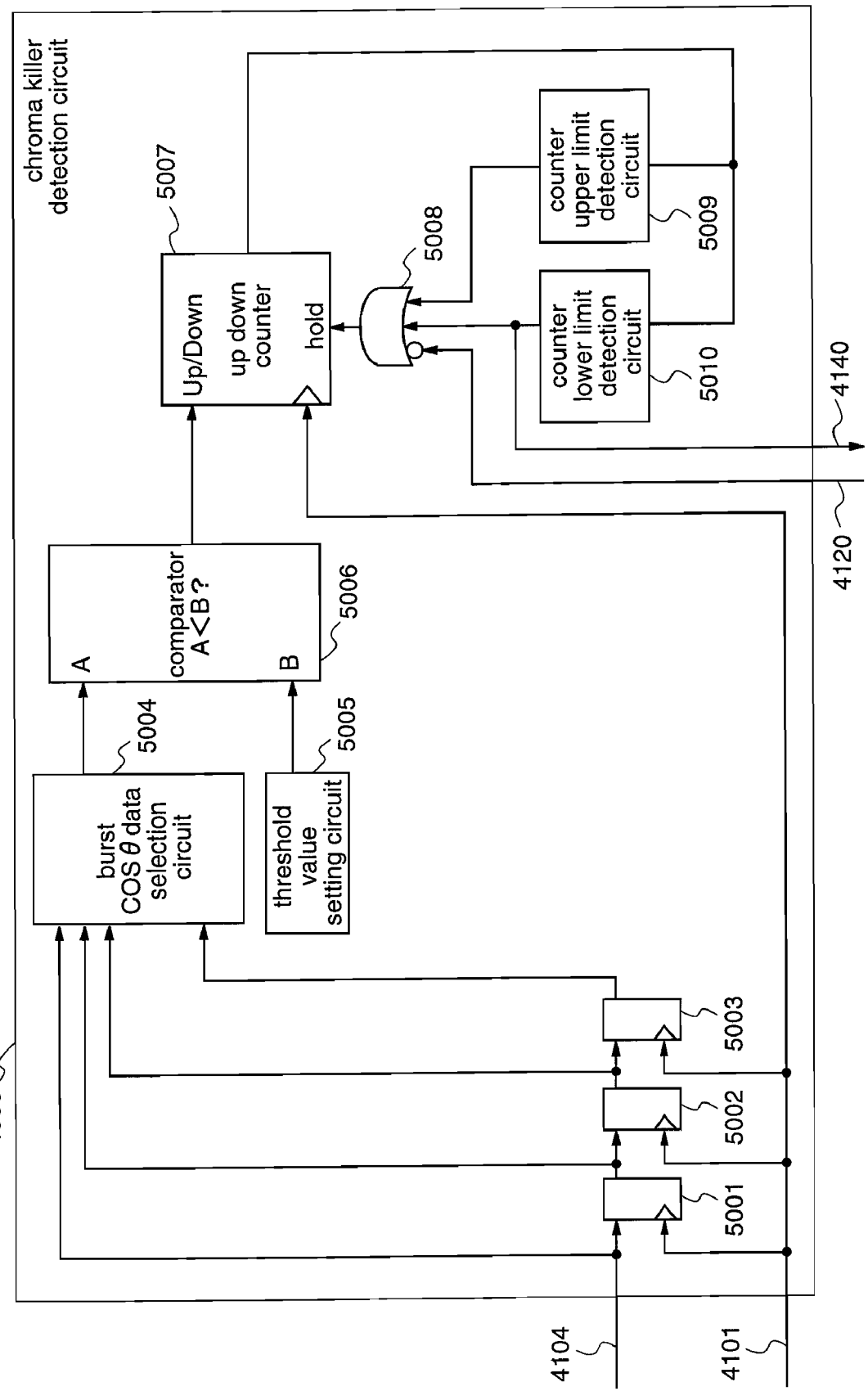
FIG. 5 is a circuit diagram illustrating the conventional chroma killer detection circuit.

The burst cos θ data selection circuit 1004 has the same construction as the conventional chroma killer detection circuit shown in FIG. 5, and outputs the data of (2)', which is sampled at the timing of 603 a sin FIG. 6 in the examples of (1)' to (4)'.

Figure 7:
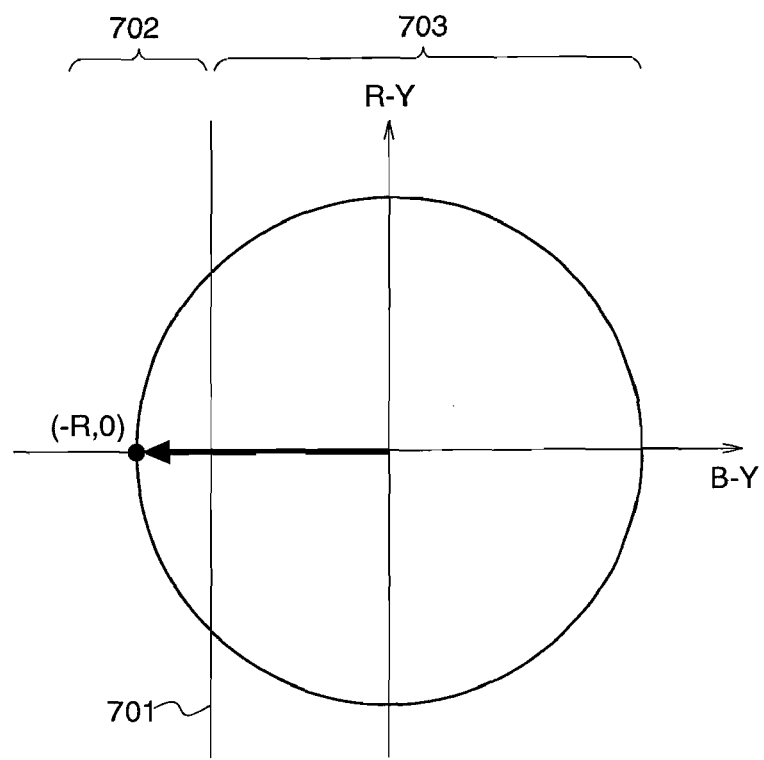
FIG. 7 is an example of the vector diagram for explaining the operation of the conventional chroma killer detection circuit.
Figure 8:
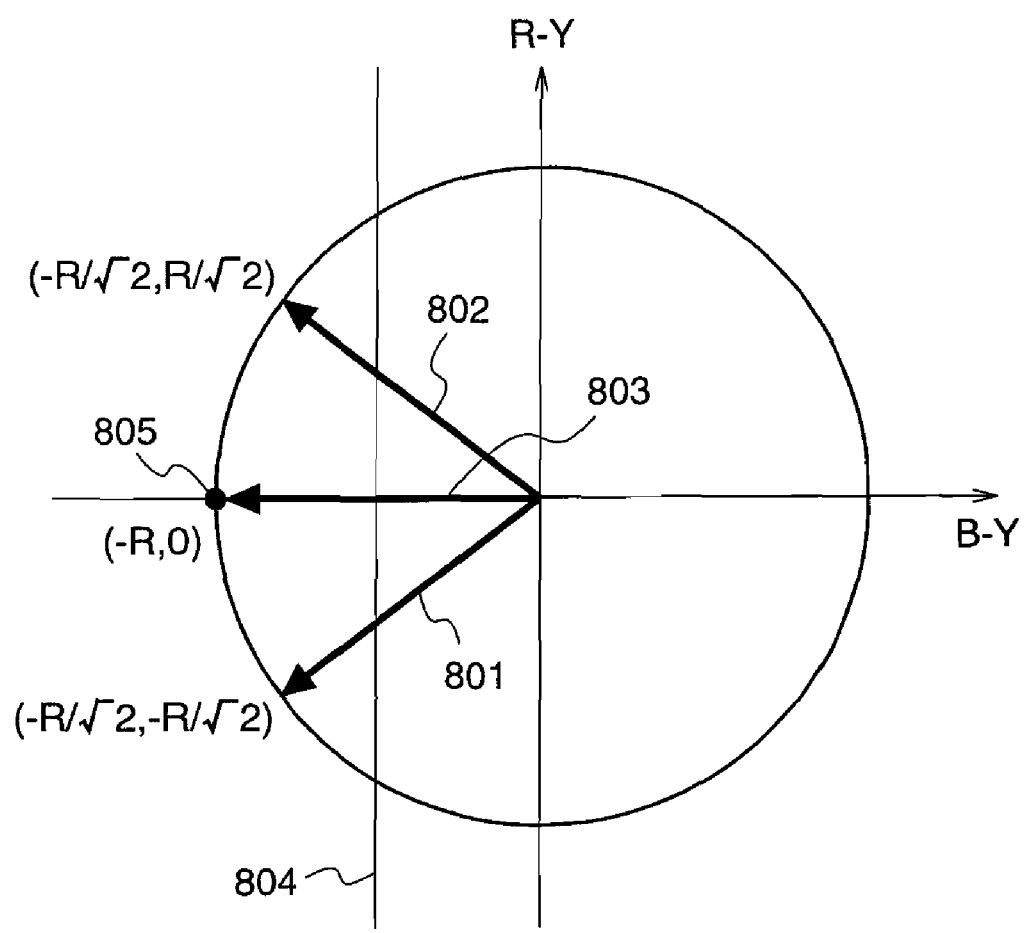
FIG. 8 is a vector diagram of PAL system for explaining the operation of the conventional chroma killer detection circuit.

The first threshold value setting circuit 1005 and the first comparator 1006 have the same constructions as the threshold value setting circuit 5005 and the comparator 5006 in the conventional chroma killer detection circuit. As shown in FIG. 7, the first comparator 1006 outputs a signal indicating normal state if there is a vector in the region 702 in the vector diagram, while outputs a signal indicating abnormality state if there is a vector in the region 703 in the vector diagram, with taking the value 701 as a threshold value for the B-Y components. The comparison result which is outputted from the first comparator 1006 is inputted to the AND circuit 1053.

Figure 2:
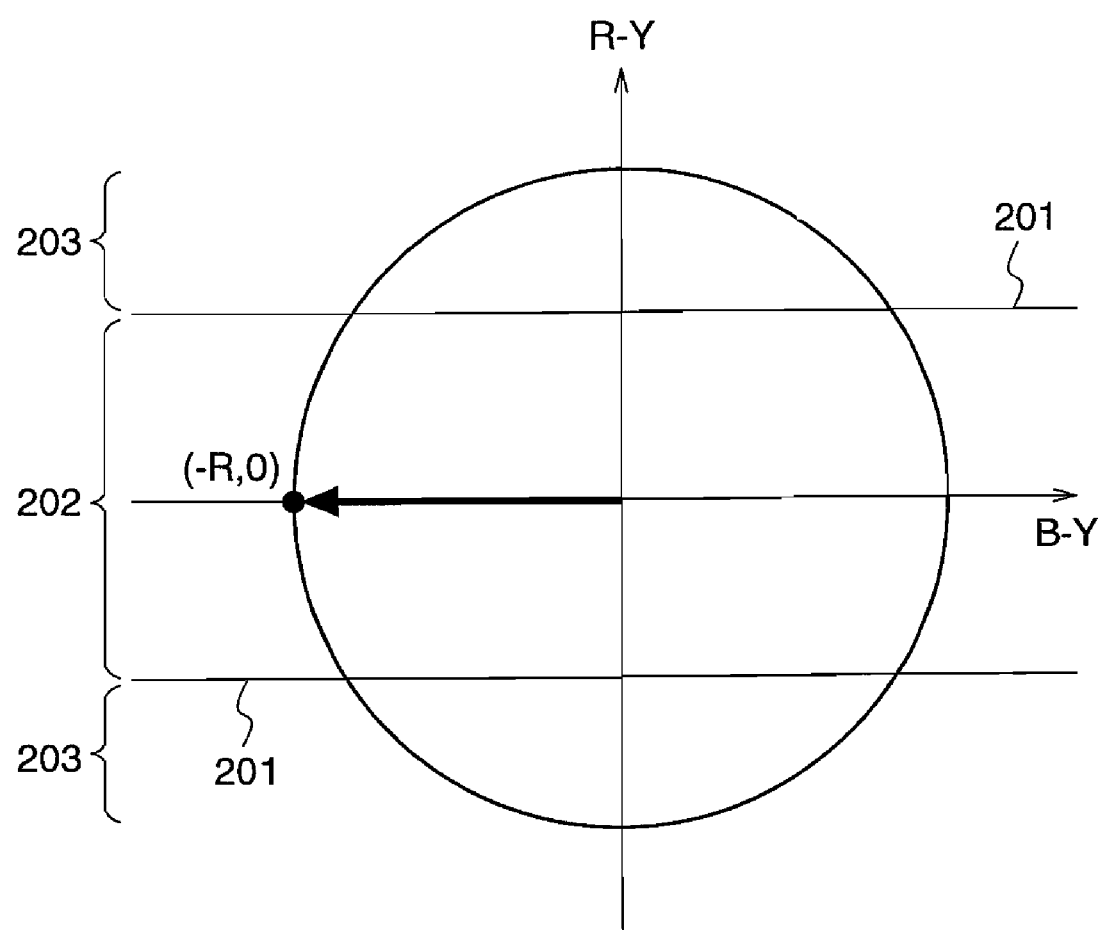
FIG. 2 is an example of the vector diagram explaining operation of the chroma killer circuit of the first embodiment of the present invention.

FIG. 2 is a diagram illustrating a method of selecting the data which is obtained by sampling the R-Y components of the burst signal in the chroma killer detection circuit of the first embodiment.

In FIG. 2, reference numeral 201 denotes the output of the second threshold setting circuit 1051, and takes an arbitrary value on the R-Y components. The second comparator 1052 makes a signal indicating normal state when there is a vector in the region 202 in the vector diagram inputted to the AND circuit 1053, while makes a signal indicating abnormality state when there is a vector in the region 203 in the vector diagram inputted thereto. The AND circuit 1053 takes an AND of the output from the first comparator 1006, i.e., the information indicating the normal/abnormal state of the B-Y components of the burst signal, and the output of the second comparator 1052, i.e., the information indicating the normal/abnormal state of the R-Y components of the burst signal, and makes an UP signal inputted to the up down counter 1007 when the result is in normal state, while makes a DOWN signal inputted thereto when the result is in abnormal state. The up down counter 1007 counts the operation result of the AND circuit 1053, and makes the counted result to the counter upper limit detection circuit 1009 and to the counter lower limit detection circuit 1010.

The counter upper limit detection circuit 1009 makes, when the counted result of the up down counter 1007 has reached the upper limit, a signal indicating that, inputted to the OR circuit 1008. The counter lower limit detection circuit 1010 makes, when the counted result of the up down counter 1007 has reached the lower limit, a signal indicating that, inputted to the OR circuit 1008, and this signal is further outputted to the outside as a chroma killer signal 4140. The OR circuit 1008 carries out such a control that the up down counter 1007 is held.

The conditions on which the up down counter 1007 is stopped (held) are satisfied during when the counter upper limit detection circuit 1009 has detected the upper limit, or when the counter lower limit detection circuit 1010 has detected the lower limit, or when the input signal is not in the burst portion. The timings at which the input signal is not in the burst portion is indicated by the burst gate pulse 420. Until when the counter lower limit detection circuit 1010 detects the lower limit value while the up down counter 1007 counts the result of the AND circuit 1053, the DOWN signal is inputted as abnormal state to the up down counter 1007, and when the abnormality state of the burst signal is continued to be detected, the chroma killer detection is turned ON.

As described above, according to the first embodiment of the present invention, it is constructed such that in addition to the cos θcomponents data on the (B-Y) axis, the |sin θ| components data on the (R-Y) axis is also reflected as phase information of the burst signal thereby to generate a chroma killer signal, more precise burst phase information can be obtained by the R-Y components of the burst signal being added to the normal/abnormal information of the burst phase, thereby it is possible to enhance the detection precision such as "pheudo burst lock".

Second Embodiment

Next, a chroma killer detection circuit according to a second embodiment of the present invention will be described.

Figure 3:
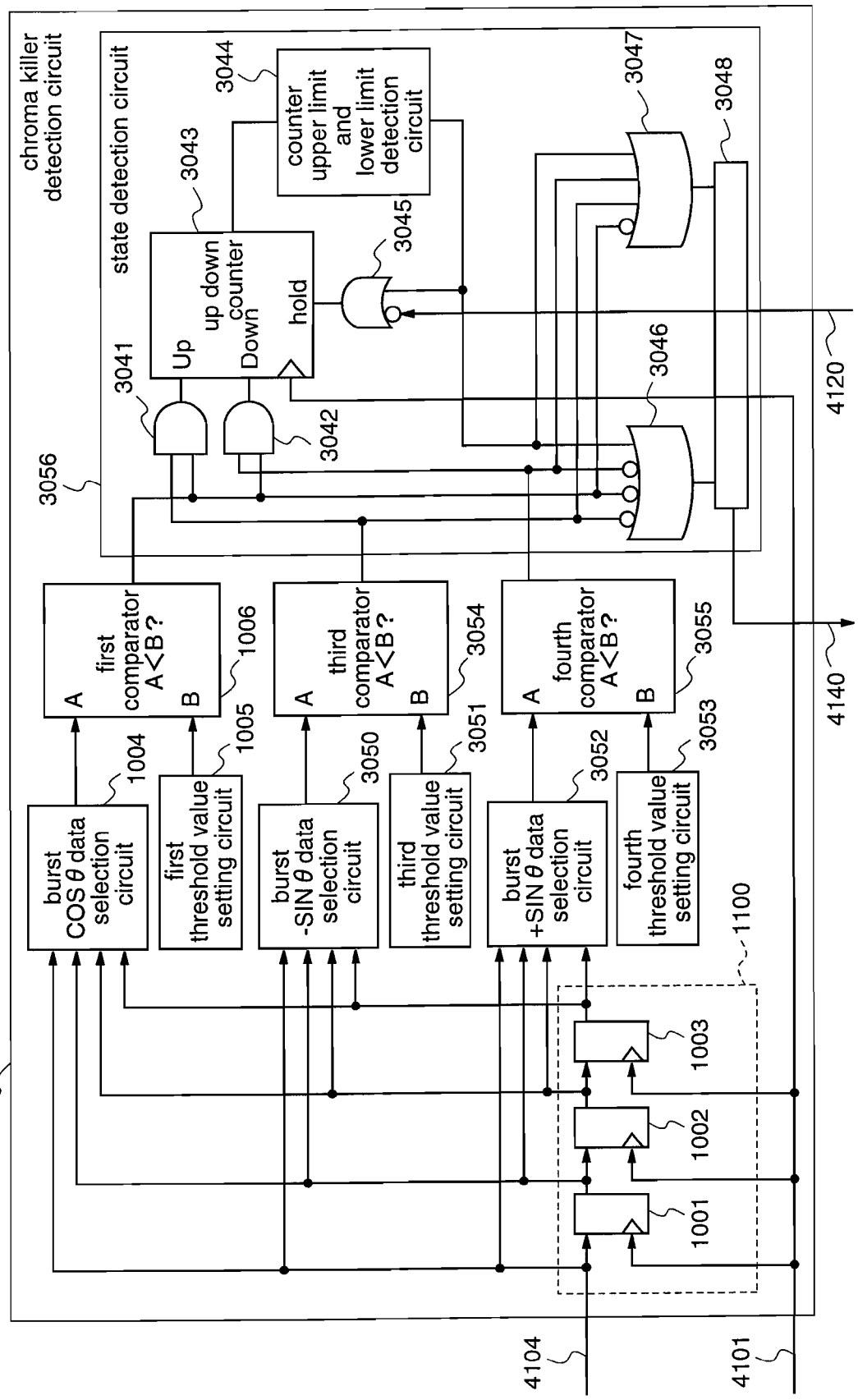
FIG. 3 is a circuit diagram a circuit diagram illustrating a chroma killer detection circuit according to a second embodiment of the present invention.

FIG. 3 is a diagram illustrating the chroma killer detection circuit of this second embodiment. In the figure, the reference numerals designate the same or corresponding portions a sin FIG. 1. Numeral 3050 denotes a burst −sin θ data selection circuit, numeral 3051 denotes a third threshold value setting circuit, numeral 3052 denotes a burst +sin θ data selection circuit, numeral 3053 denotes a fourth threshold value setting circuit, numeral 3054 denotes a third comparator, numeral 3055 denotes a fourth comparator, and numeral 3056 denotes a state detection circuit.

The state detection circuit 3056 includes a first AND circuit 3041, a second AND circuit 3042, an up down counter 3043, a counter upper and lower limit detection circuit 3044, a first OR circuit 3045, a second OR circuit 3046, a third OR circuit 3047, and a killer decoder circuit 3048.

Color signal components 4104 are inputted to the first flip flop 1001, the burst cos θ data selection circuit 1004, the burst −sin θ data selection circuit 3050, and the burst +sin θ data selection circuit 3052. The output of the first flip flop 1002 is inputted to the second flip flop 1003, the burst cos θ data selection circuit 1004, the burst −sin θ data selection circuit 3050, and the burst +sin θ data selection circuit 3052. The output of the second flip flop 1002 is inputted to the third flip flop 1003, the burst cos θ data selection circuit 1004, the burst −sin θ data selection circuit 3050, and the burst +sin θ data selection circuit 3052. The first flip flop 1001, the second flip flop 1002, and the third flip flop 1003 are operated with the reference clocks 4101, respectively.

The burst cos θ data selection circuit 1004 has the same construction as the cos θ data selection circuit 5004 in the conventional chroma killer detection circuit shown in FIG. 5, and outputs the data of (2)', which is sampled at the timing of 603 in FIG. 6 in the examples of (1)' to (4)'.

The burst −sin θ data selection circuit 3050 outputs the data of (3)', which is sampled at the timing of 604 in FIG. 6 in the examples of (1)' to (4)'. In addition, the burst +sin θ data selection circuit 3052 outputs the data of (1)', which is sampled at the timing of 602 in FIG. 6 in the examples of (1)' to (4)'.

The first comparator 1006 compares the output data of the burst cos θ data selection circuit 1004 and an arbitrary value of the B-Y components which is set by the first threshold value setting circuit 1005, and when the output of the burst cos θ data selection circuit 1004 is smaller than the output of the first threshold value setting circuit 1005, it is inputted to the state detection circuit 3056 as being in normal state.

The third comparator 3054 compares the output data of the burst −sin θ data selection circuit 3050 and an arbitrary value of the R-Y components which is set by the third threshold value setting circuit 3051, and when the output of the burst −sin θ data selection circuit 3050 is smaller than the output of the third threshold value setting circuit 3050, it is inputted to the state detection circuit 3056 as being in normal state. Herein, the setting range of the third threshold value setting circuit 3051 is set as a value less than zero.

The fourth comparator 3056 compares the output data of the burst sin θ data selection circuit 3052 and an arbitrary value of the R-Y components which is set by the fourth threshold value setting circuit 3053, and when the output of the burst +sin θ data selection circuit 3052 is larger than the output of the fourth threshold value setting circuit 3053, it is inputted to the state detection circuit 3056 as being in normal state. Herein, the setting range of the fourth threshold value setting circuit is set as a value larger than zero.

The output of the first comparator 1006 and the output of the third comparator 3054 are inputted to the first AND circuit 3041 of the state detection circuit 3056 and its operation result is inputted to an UP signal terminal of the up down counter 3043. In addition, the output of the first comparator 1006 and the output of the fourth comparator 3055 are inputted to the second AND circuit 3042 of the state detection circuit 3056 and its operation result is inputted to the DOWN signal terminal of the up down counter 3043. The output of the up down counter 3043 is inputted to the counter upper and lower limit detection circuit 3044. The output of the counter upper and lower limit detection circuit 3044 and an inverted signal of the burst gate pulse 4120 are inputted to the first OR circuit 3045.

The output of the first OR circuit 3045 is connected to the HOLD terminal of the up down counter 3043. To the second OR circuit 3046, the output of the counter upper and lower limit detection circuit 3044, an inverted signal of the output of the first comparator 1006, an inverted signal of the output of the third comparator 3054, and an inverted signal of the output of the fourth comparator 3055 are inputted, and it is operated as a first killer judgment circuit. In addition, to the third OR circuit 3047, the output of the counter upper limit lower limit detection circuit 3044, an inverted signal of the output of the first comparator 1006, the output of the third comparator 3054, and the output of the fourth comparator 3055 are inputted, and it is operated as a second killer judgment circuit. The output of the OR circuit 3046 and the output of the third OR circuit 3047 are inputted to the killer decoder circuit 3048. The output of the killer decoder circuit 3048 is outputted to the outside as a chroma killer signal 4140.

The operation of the chroma killer detection circuit 3000 of the second embodiment described as above will be described.

By the chroma killer detection circuit of this second embodiment, it is possible to discriminate the signals of the same M systems (having the scanning line number of 525, the field frequency of 60 Hz, and the carrier frequency of 3.58 MHz) such as the PAL-M system and the NTSC system, thereby to detect the burst signal phase.

Figure 4:
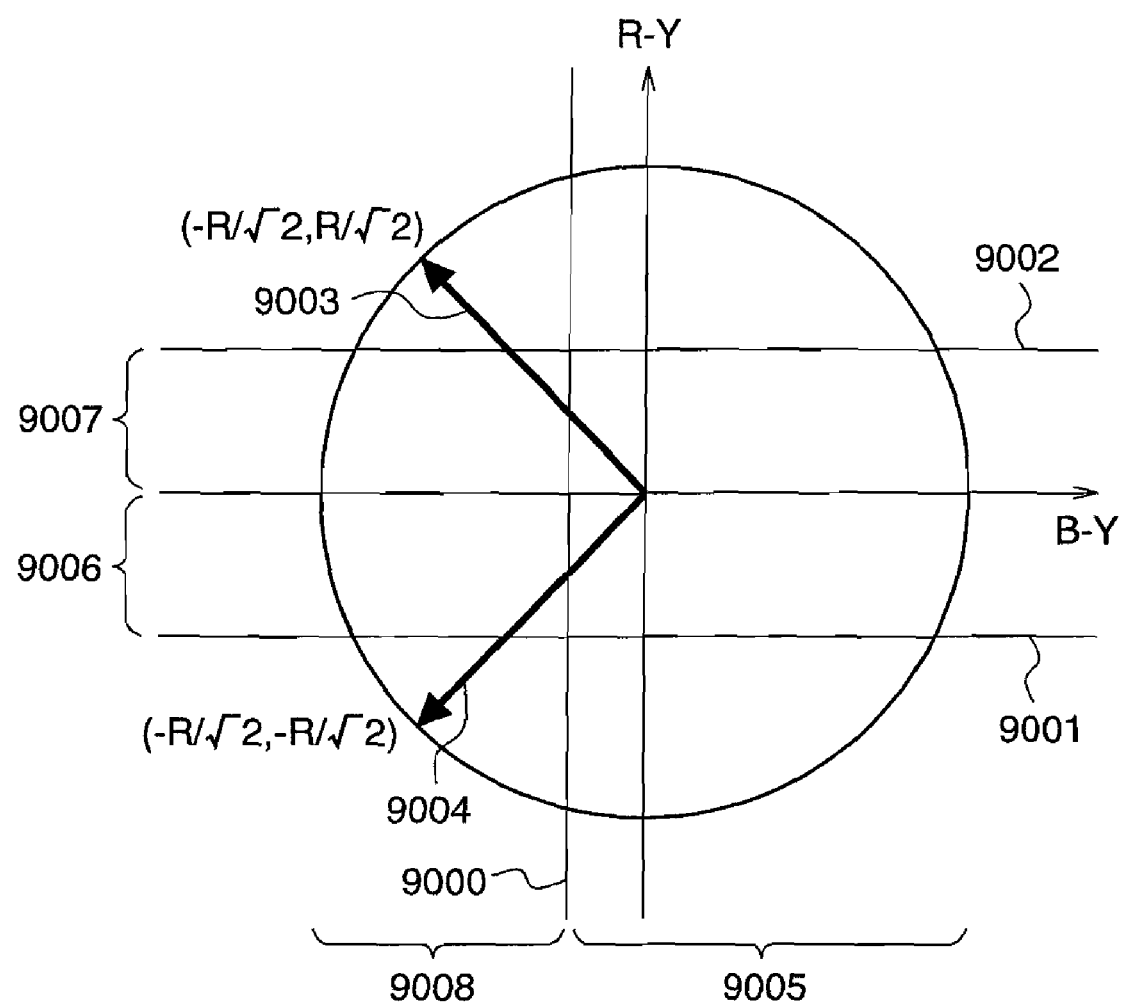
FIG. 4 is an example of the vector diagram explaining operation of the chroma killer circuit of the second embodiment of the present invention.

FIG. 4 is a vector diagram illustrating the state where a PAL-M system signal is inputted into the chroma killer detection circuit of the second embodiment of the present invention.

In FIG. 4, numeral 9000 denotes a set value of the first threshold setting circuit 1005, numeral 9001 denotes a set value of the third threshold value setting circuit 3051, and numeral 9002 denotes a set value of the fourth threshold value setting circuit 3052. Numeral 9003 denotes a vector having a burst phase of +135° and numeral 9004 denotes a vector having a burst phase of −135°. The vector 9003 having a burst phase of +135° and the vector 9004 having a burst phase of −135° appear alternately for each line.

The region where the region that is smaller than 9000 and the region that is smaller than 9001 overlap with each other is obtained by the operation of the first AD circuit 3041, and when there exists a vector such as 9004 in this region, the up down counter 3043 carries out counting in the Up direction. The region where the region that is smaller than 9000 and the region that is larger than 9002 overlap with each other is obtained by the operation of the second AND circuit 3042, and when there exists a vector such as 9003 in this region, the up down counter 3043 carries out counting in the DOWN direction. In other words in case of PAL-M system, the counted value of the up down counter 3043 repeats the UP counting and the DOWN counting for each line thereby to converge into zero. Then, the counter upper and lower limit detection circuit 3044 does not carry out detection operation. When the counter upper and lower limit detection circuit 3044 detects the upper limit value or the lower limit value by the UP counting or the DOWN counting of the up down counter 3043, it is judged as the alternate property for each line a sin the PAL-M system cannot be recognized. The up down counter 3043 halts its counting when the burst gate pulse 4120 is turned OFF, i.e., it is not in the burst signal period, and when the counter upper and lower limit value 3044 has detected the upper limit value or the lower limit value.

The region of 9005 shown in FIG. 4 corresponds to a vector of an inverted signal of the output of the first comparator 1006, which is inputted in the region that is smaller than the set value 9000 of the first threshold value setting value circuit 1005 as being in normal state, the region of 9006 corresponds to a vector of an inverted signal of the output of the third comparator 3054, which is inputted in the region that is smaller than the set value 9002 of the third threshold value setting circuit 3051 as being in normal state, and in the region of 9007, there is a vector of an inverted signal of the output of the fourth comparator 3055, which is inputted in the region that is larger than the set value 9002 of the fourth threshold value setting circuit 3052 as being in normal state.

When the signal of the PAL-M system is being received, since there exist no burst signals in the region of 9005 and 9006, an inverted signal of the output of the first comparator 3054, an inverted signal of the output of the third comparator 3054, and an inverted signal of the output of the fourth comparator 3055 are always OFF. In addition, since there exists alternate property for each line in the burst signal and the value of the up down counter converges to zero, the output of the counter upper and lower limit value is always OFF. Therefore, the output of the second OR circuit 3046 is also always OFF. By the similar input, the output of the OR circuit 3047 is always ON. Therefore, when the second OR circuit 3046 and the third OR circuit 3047 are ON, it can be said as detecting the PAL-M system.

On the other hand, when the signal of the NTSC system is being received in the construction of FIG. 3, the burst signal phase is 180°, and the burst signal vector is supposed as existing in the region where the region 9008 and the region 9006 overlap with each other or in the region where the region 9008 and the region 9007 overlap with each other. Accordingly, the inverted signal of the output of the third comparator 3054 or the inverted signal of the output of the fourth comparator 3055 is turned ON, the output of the second OR circuit 3046 is turned ON, and further, by similar inputs, the third OR circuit 3047 is turned OFF. Accordingly, when the second OR circuit 3046 is ON and the third OR circuit 3047 is OFF, it is shown the state where the signal of the NTSC system is being received.

In another signal example, when the NTSC signal is phase shifted by −45° and it is pheudo locked at +135°, the second AND circuit 3042 is turned ON and thereby the up down counter 3043 continues to carry out DOWN counting, and when the counter upper and lower limit detection circuit 3044 detects the lower limit, it is turned ON. Accordingly, the output of the second OR circuit 3046 is turned ON, and by the similar inputs, the third OR circuit 3047 are turned ON. Accordingly, when the second OR circuit 3046 is ON and the third OR circuit 3047 is ON, it is shown the state where the signal which is other than the PAL-M system and also other than the NTSC system is being received.

The killer decoder circuit 3048 outputs, when the second OR circuit 3046 is turned ON, a chroma killer signal indicating that the signal other than the PAL system is inputted, when the third OR circuit 3047 is turned ON, a chroma killer signal indicating that the signal other than the NTSC system is inputted, and when both of the second OR circuit 3046 and the third OR circuit 3047 are turned ON, a chroma killer signal indicating that the signal other than both of the PAL system and the NTSC system is inputted. As such, the killer decoder circuit 3048 decodes from the results of the second OR circuit 3046 and the third OR circuit 3047, information indicating any of the NTSC system, the PAL system, or the system which is other than both of the above, to output it as a chroma killer signal.

As described above, according to the second embodiment, a construction in which in addition to the cos θ components data on the (B-Y) axis, the −sin θ components data on the −(R-Y) axis and the +sin θ components data on the (R-Y) axis are also adopted as phase information of the burst signal, thereby to produce a chroma killer signal is adopted. Therefore, when the signal of the NTSC system, the signal of the PAL system, or the signal of other than the both systems are received respectively, the states which are respectively different from each other are detected thereby to output a signal indicating each different state. Therefore, the judgment of the broadcasting system can be carried out on the basis of the detected chroma killer signal.

APPLICABILITY IN INDUSTRY

The present invention can carry out the detection of abnormality signal such as pheudo lock or discrimination of the broadcasting system with using cos θ components, −sin θ components, and +sin θ components of the phases of the burst signal with high precision.

The invention claimed is:

1. A chroma killer detection circuit, comprising:
a sampling circuit which receives a reference clock signal which has a frequency of four times of the burst signal which is generated from the color signal components which are digitized and which are synchronized with the burst signals and samples the cos θ components of the digitized color signal components on the (B-Y) axis, −cos θ components thereof on the −(B-Y) axis, sin θ components thereof on (R-Y) axis, and −sin θ components thereof on −(R-Y) axis;
a cos θ components selection circuit for selecting cos θ components data among the data which are outputted from the sampling circuit,
a first threshold value setting circuit for setting an arbitrary value on the (B-Y) axis which corresponds to the cos θ components data;
a first comparator which compares the set value of the first threshold value setting circuit and the output data of the cos θ components data selection circuit and judges whether the cos θ components data on the (B-Y) axis are in abnormality state or in normal state from the comparison result;
a −sin θ components data selection circuit which selects the −sin θ components data among the data which are outputted from the sampling circuit;
a third threshold value setting circuit for setting an arbitrary value on the −(R-Y) axis corresponding to the −sin θ components data;
a third comparator which compares the set value of the third threshold value setting circuit and the output data of the −sin θ components data selection circuit and judges whether the −sin θ components data on the −(R-Y) axis are in abnormality state or in normal state from the comparison result;
a +sin θ components data selection circuit which selects the +sin θ components data among the data which are outputted from the sampling circuit;
a fourth threshold value setting circuit for setting an arbitrary value on the +(R-Y) axis corresponding to the +sin θ components data;
a fourth comparator which compares the set value of the fourth threshold value setting circuit and the output data of the +sin θ components data selection circuit and judges whether the +sin θ components data on the +(R-Y) axis are in abnormality state or in normal state from the comparison result;
a judging circuit for judging normality or abnormality on the basis of the judgment result of the first comparator, the judgment result of the third comparator, and the judgment result of the fourth comparator;
a counter circuit for counting the judgment result of the judgment circuit;
a counter upper and lower limit detection circuit which observes the counted result of the counting circuit and outputs, when the counted value reaches a predetermined upper limit value or when the counted value reaches a predetermined lower limit value, a signal indicating that, respectively;
a first killer judgment circuit which carries out killer judgment on the basis of the judgment result of the first comparator, the judgment result of the third comparator, the judgment result of the fourth comparator, and the output of the counter upper and lower limit value detection circuit;
a second killer judgment circuit which carries out killer judgment on the basis of the judgment result of the first comparator, the judgment result of the third comparator, the judgment result of the fourth comparator, and the output of the counter upper and lower limit value detection circuit; and
a killer judgment decoder circuit which decodes the results of the first killer judgment circuit and the second killer judgment circuit and generates a chroma killer signal indicating the broadcasting system of the received signal.

2. A chroma killer detection circuit as defined in claim 1, wherein
said first comparator outputs a signal indicating the normal state when the cos θ components data is lower than the set value of the first threshold value setting circuit,
said third comparator outputs a signal indicating the normal state when −sin θ components data is lower than the set value of the third threshold value setting circuit,
said fourth comparator outputs a signal indicating the normal state when +sin θ components data is lower than the set value of the fourth threshold value setting circuit,
said judging circuit outputs the result of taking a logical product of the output of the first comparator and the output of the third comparator as the first judgment result, and outputs the result of taking a logical product of the output of the first comparator and the output of the fourth comparator as a second judgment result,
said counter circuit carries out counting up when it receives the output of the first judgment result, carries out counting down when it receives the output of the second judgment result, and stops the counting when said counter upper and lower limit detection circuit has detected the upper limit or the lower limit or when other than the burst signal portion among the digitized color signal components signal are being inputted.

3. A chroma killer detection circuit as defined in claim 1, wherein
said first killer judgment circuit outputs a first killer judgment detection signal to said killer judgment decoder circuit when it receives any of a signal indicating abnormality state from the first comparator, a signal indicating abnormality state from the third comparator, a signal indicating abnormality state from the fourth comparator, and a signal indicating the detection of the upper or lower limit by the counter upper and lower limit detection circuit,
said second killer judgment circuit outputs a second killer judgment detection signal to said killer judgment decoder circuit when it receives any of a signal indicating abnormality state from the first comparator, a signal indicating abnormality state from the third comparator, a signal indicating abnormality state from the fourth comparator, and a signal indicating the detection of the upper or lower limit by the counter upper and lower limit detection circuit, and said killer judgment decoder circuit outputs a chroma killer signal indicating that a signal of a system other that the PAL system is being inputted when it has received said first killer judgment detection signal, outputs a chroma killer signal indicating that a signal of a system other that the NTSC system is being inputted when it has received said second killer judgment detection signal, and outputs a chroma killer signal indicating that a signal of a system other than the PAL system and the NTSC system is being inputted when it has received both of said first and second killer judgment detection signals.

4. A chroma killer detection circuit as defined in claim 2, wherein said first killer judgment circuit outputs a first killer judgment detection signal to said killer judgment decoder circuit when it receives any of a signal indicating abnormality state from the first comparator, a signal indicating abnormality state from the third comparator, a signal indicating abnormality state from the fourth comparator, and a signal indicating the detection of the upper or lower limit by the counter upper and lower limit detection circuit, said second killer judgment circuit outputs a second killer judgment detection signal to said killer judgment decoder circuit when it receives any of a signal indicating abnormality state from the first comparator, a signal indicating abnormality state from the third comparator, a signal indicating abnormality state from the fourth comparator, and a signal indicating the detection of the upper or lower limit by the counter upper and lower limit detection circuit, and said killer judgment decoder circuit outputs a chroma killer signal indicating that a signal of a system other that the PAL system is being inputted when it has received said first killer judgment detection signal, outputs a chroma killer signal indicating that a signal of a system other that the NTSC system is being inputted when it has received said second killer judgment detection signal, and outputs a chroma killer signal indicating that a signal of a system other than the PAL system and the NTSC system is being inputted when it has received both of said first and second killer judgment detection signals.

\* \* \* \* \*